United States Patent [19]

Johnson

[11] 4,273,146
[45] Jun. 16, 1981

[54] COOLING TOWER OPERATION WITH AUTOMATED PH CONTROL AND BLOWDOWN

[75] Inventor: Neal W. Johnson, Woods Cross, Utah

[73] Assignee: Phillips Petroleum Company, Bartlesville, Okla.

[21] Appl. No.: 1,345

[22] Filed: Jan. 5, 1979

[51] Int. Cl.³ .......................................... G05D 11/02
[52] U.S. Cl. ........................................ 137/5; 137/2; 137/93
[58] Field of Search ................................. 137/93, 2, 5

[56] References Cited

U.S. PATENT DOCUMENTS

| 2,787,281 | 4/1957 | Word | 137/93 |
| 3,223,121 | 12/1965 | Lee | 137/93 |
| 3,361,150 | 1/1968 | Horner | 137/93 |
| 3,424,975 | 1/1969 | Sanford | 324/30 |
| 3,592,212 | 7/1971 | Schleimer | 137/93 |

OTHER PUBLICATIONS

Considine and Ross, *Handbook of Applied Instrumentation* pp. 14–32.

*Primary Examiner*—Gerald Goldberg
*Assistant Examiner*—Denis E. Corr

[57] ABSTRACT

Cooling tower water is analyzed for pH and electrical conductivity. In response to the pH measurement, acid addition is made periodically (intermittently) so that fluctuations in pH during acid addition are minimized. The conductivity measurement, which relates to salts concentration, controls periodic (intermittent) blowdown of water having high salts concentration so as to minimize waste of water and water additives during blowdown.

4 Claims, 1 Drawing Figure

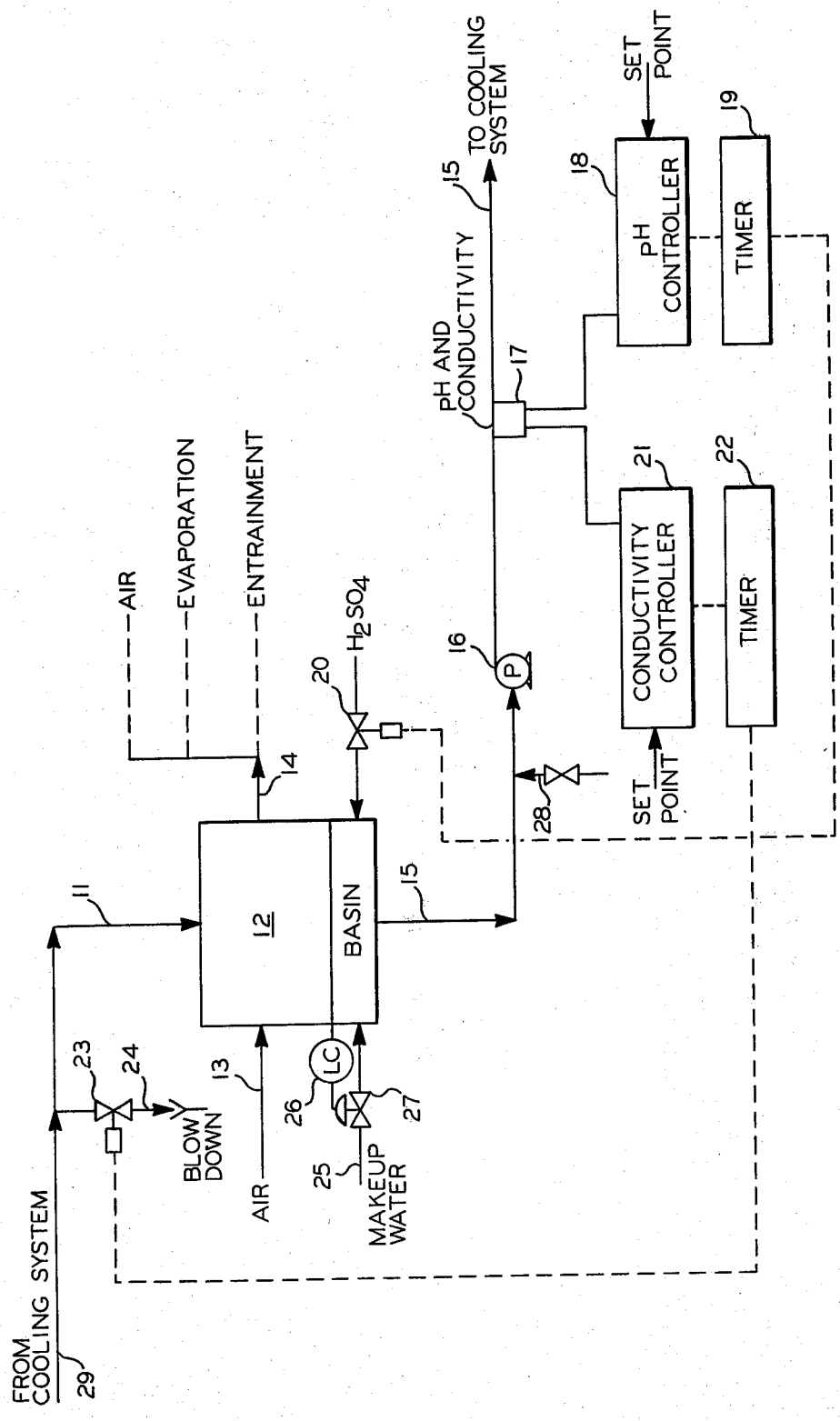

COOLING TOWER OPERATION WITH AUTOMATED PH CONTROL AND BLOWDOWN

BACKGROUND OF THE INVENTION

1. Field of the Invention

This invention relates to the operation of a cooling tower used to cool water which is circulated for indirect heat exchange with warmer fluids. The invention further relates to methods of preventing scale buildup in the cooling tower and circulation system by maintaining preset levels of pH and electrical conductivity of the water. It also relates to time-delay systems for preventing large fluctuations in pH and conductivity as those variables are being maintained at the preset levels.

2. Description of the Prior Art

In a system in which water is used for indirect heat exchange with the fluids being processed, the warmed water is passed through a cooling tower wherein it is cooled and collected for recirculation. The water entering the tower is cooled by air from the outside as the water drops from the place of entry in the top of the tower to the basin in the bottom of the tower. During the process, some of the water evaporates and some is carried from the tower entrained by the air. A result of this water loss is an increase in the concentration of dissolved solids, or salts, in the cooling system water. To prevent an excessive increase in salts concentration, water from the system is discharged in an operation known as "blowdown," and the evaporated water, water lost by entrainment, and water lost to blowdown are replaced with fresh, or makeup, water.

To prevent precipitation of the ions in solution, thus forming scale on the surfaces of the system and reducing the efficiency of heat exchange, the pH of the water must be lowered by the addition of an acid. In systems for controlling pH and salts concentration, a problem which arises is wide fluctuations in pH or conductivity, a measurement related to salts concentration, caused by rapid or excessive addition of acid or excessive blowdown. Too large an addition of acid increases the corrosiveness of the water and excessive blowdown results in the waste of acid and other additives present in the discharged water. It would thus be desirable to regulate the addition of acid to the cooling system water so as to avoid large fluctuations in pH, which result in temporary high concentrations of corrosive acids in the system and difficulty in obtaining accurate continuous pH measurements. It would also be desirable in conjunction with such a process to have a method of regulating blowdown of the system so as to prevent waste of water and water additives from excessive blowdown.

It is thus an object of the invention to monitor and control the acidity and salts concentration and thus to minimize scale formation in a circulating water system. It is a further object to add acid to cooling system water and replace water having a high salts concentration with fresh water in such a way as to minimize fluctuations in pH and electrical conductivity, thus making more accurate control of salts buildup possible, minimizing the corrosiveness of the water solution, and reducing waste of water and water additives.

SUMMARY OF THE INVENTION

The present invention provides a method by which it is possible to automatically regulate acid addition to the cooling system water in response to pH measurement so that the pH varies over a narrow range with each acid addition, and also to control the blowdown operation so that the conductivity of the system water decreases gradually with the discharge of water during blowdown. According to the invention water from the cooling tower is analyzed for pH and electrical conductivity. A timer is actuated in response to a pH reading at a preset value. The timer actuates the intermittent flow of acid at a predetermined rate into the water. The intermittent addition is terminated when the pH is brought back to the desired level. At this point, the system water pH will begin to rise once more, and the timing cycle will again be initiated when the pH reaches the pH setpoint. Also in accordance with the invention, there is provided a method for measuring the electrical conductivity of the cooling tower water and automatically releasing some of the system water in response to a conductivity measurement at a preset level, the release of system water being effected intermittently on a timed cycle which is terminated when sufficient water with a high salts concentration has been released and replaced with makeup water to bring the electrical conductivity of the system water to the preset value. Thus, although the pH and conductivity measurements actuate separate processes, the two processes are interrelated in accomplishing the object of maintaining high heat exchange efficiency by preventing scale buildup. When blowdown occurs, water containing acid is removed and is replaced by water to which acid must be added. Thus the process of eliminating water having a high salts concentration naturally disrupts the pH balance of the system, which makes it necessary for the acid-addition system to be activated. The pH-monitoring system, by adding acid to keep scale-forming ions in solution, necessarily contributes to the buildup of dissolved salts and makes it necessary to periodically replace the system water with fresh water.

BRIEF DESCRIPTION OF THE DRAWING

The drawing is a schematic flow diagram illustrating one embodiment of the invention.

DETAILED DESCRIPTION OF THE INVENTION

Referring to the drawing, water which has been used for indirect heat exchange with hydrocarbons in a refinery enters cooling tower 12 through conduit 11. Air can be moved through the cooling tower by a fan (not shown), either induced draft or forced draft, or by natural atmospheric air current. A forced draft system is schematically shown in the drawing. As water drops down through the cooling tower, it is cooled by the air 13 flowing through the tower. Water which is lost from the system through evaporation and entrainment is carried away by the air, as represented schematically by reference numeral 14. Most of the cooled water collects in the basin of the cooling tower, where it is available for recirculation through the refinery cooling system.

Water from the cooling tower basin flows from the tower through conduit 15 and can be pumped 16 through the system for indirect heat exchange. A sample of cooling system water is analyzed by pH and conductivity sensor 17, which contains three individual probes: one for pH measurement, one for pH reference, and one for conductivity. pH and conductivity signals from the sensor are transmitted to pH controller 18 and to conductivity controller 21, respectively.

pH controller 18 is adjusted for a high pH setpoint. The pH of a typical system will generally be maintained at about 5.5-7, preferably 6.2 to 6.8. The range chosen will depend to some extent upon the effective range of the corrosion inhibitor added to offset the corrosive effect of the acid added to the system. The acid used can be any acid but is preferably sulfuric acid. When the pH of the system water reaches the setpoint, the setpoint relay of pH controller 18 is energized. This relay switching activates the timer and the acid-addition cycle is initiated. The first segment of the timing cycle is a dwell period between the acid addition periods. Acid is added to the cooling tower through valve 20 in intervals which depend upon the dimensions of the cooling tower, basin retention time, makeup water and acid injection points, blowdown points, pH and conductivity sample points, and the pH of the makeup water. The acid addition phase will generally be about 1-12 seconds long. The amount of acid added must be sufficient to cause the pH to be lowered but not so large as to cause the pH to temporarily be outside the optimum range. The dwell periods between acid additions generally are about 4-10 minutes, which permits the pH to stabilize before the next acid addition. In a typical operation, timer 19 would operate at 10 cycles per hour, with 6-second acid addition phases, each such phase of the cycle resulting in the addition of about 0.1 lb. of 96% by weight sulfuric acid. During the acid addition phase, the acid addition valve 20 is energized, allowing acid to enter the cooling tower. Valve 20 can be any conventional pneumatic or solenoid valve. pH control unit 18 can be a conventional pH controller such as the Unilock Model 17 available from Universal Unilock Company. This controller activates an electric circuit which energizes timer 19. Timer 19 is a conventional reset timer such as the Taylor Flex-O-Timer manufactured by Taylor Instrument Company. In one embodiment of the invention, two conventional reset timers, wired to operate in a repeat cycle operation, are used. The timer provides an intermittent output signal which causes valve 20 to open intermittently on the desired cycle during the time the setpoint relay of controller 18 is energized. When the pH returns to the desired level and the setpoint relay is deenergized, timer 19 is reset automatically so that, when the setpoint relay is energized again the first segment of the timing cycle again is a dwell period. This type of operation makes certain that valve 20 is closed when the pH is within the desired range.

The corrosiveness of the acid added to the cooling system generally makes it necessary to add a corrosion inhibitor at 28 such as the phosphatecyanide composition disclosed in U.S. Pat. No. 2,515,529. The amount used is usually 4 to 8 ppm by weight of inhibitor in the circulating water.

Samples of cooling system water are analyzed for electrical conductivity, a measure of the ions in solution, at sensor 17. The high setpoint for conductivity will depend upon the particular plant and water conditions, but a typical setting will generally be chosen from a range of 2-4 times the normal salt concentration of the makeup water but not to exceed about 4000 micromhos. That is, in operations such as the one represented by the drawing and the calculated example, using water having a normal conductivity of about 800-850 micromhos, the conductivity setpoint is about 2500 micromhos. As the conductivity of the system water approaches and surpasses the setpoint, the setpoint relay of controller 21 is energized. This relay switching activates timer 22. When the timer is activated, a timed cycle for releasing water from the system begins. A cycle includes the time during which valve 23 is open and water is being released through conduit 24 as well as the time when the valve is closed between water releases. The dwell periods are generally about 1 to 4 minutes long, and the blowdown phases about 4 to 1 minutes long. These cycle periods can, of course, vary widely with the dimensions of the cooling tower, the concentrations of salts desired, and the makeup water. A typical cycle in a system such as that represented by the drawing is about 5 minutes, with valve 23 being open about 4 minutes of the cycle. Timer 22 can be any suitable timing device or time controller used to regulate sequence and duration of cyclic operations in industrial processes, such as the Taylor Flex-O-Timer manufactured by Taylor Instrument Company. Conductivity controller unit 21 can be any suitable controller, for example Uniloc Model 17 manufactured by Universal Unilock Company. When the conductivity measurement returns to the desired value, the timer is deactivated and the cycle is terminated.

As described above with respect to the pH control, it is necessary that the valve 23 be closed while the conductivity is in the desired range. This can be accomplished by using a reset relay.

Although the blowdown is illustrated as being taken from the return hot water in line 29, the blowdown can, if desired, be taken from the basin, in the normal manner, through a valve, not shown, controlled in the same manner as valve 23 in line 24.

Makeup water is added to the system through conduit 25. The amount of basin water can be controlled by conventional means such as level controller 26 in communication with valve 27. The release of water and the sulfuric acid it contains and the addition of makeup water, the pH of which is higher than the pH of the cooling tower water, cause the pH of the system water to rise and make it necessary to start the acid-addition cycle.

CALCULATED EXAMPLE

The following calculated example summarizes the operation of a typical refinery cooling tower operation using 400,000 gallons of circulating water.

| (15) Cooled Water to System: | |
| --- | --- |
| Temperature, °F. | 80 |
| NaCl, grains/gallon | 15 |
| Gallons per hour | 400,000 |
| pH | 6.5 |
| Concentrations | 3 |
| (29) Warmed Water from System: | |
| Temperature, °F. | 100 |
| NaCl, grains/gallon | 15 |
| Gallons per hour | 400,000 |
| pH | 6.5 |
| Concentrations | 3 |
| (24) Blowdown | |
| (preferably hot blowdown of warmed water from the system): | |
| Temperature, °F. | 100 |
| NaCl, grains/gallon | 15 |
| Gallons/hour | 2,800 |
| pH | 6.5 |
| Concentrations | 3 |
| Typical Operation of Blowdown: | |
| Cycles/hr. | 12 |
| Water removal phase, min. | 4 |
| Gallons/cycle | 233 |

-continued

| | |
|---|---|
| (11) Return Water to Tower 12: | |
| Temperature, °F. | 100 |
| NaCl, grains/gallon | 15 |
| Gallons/hour | 397,200 |
| pH | 6.5 |
| Concentrations | 3 |
| (25) Makeup Water: | |
| Temperature, °F. | 60 |
| NaCl, grains/gallon | 5 |
| Gallons/hour | 9,600 |
| pH | 6.8 |
| Concentrations | 1 |
| (13) Typical Air Flow | |
| (Temperature and dewpoint vary daily and with season): | |
| Temperature, °F. | 80 |
| Typical Wet Bulb, °F. | 70 |
| Std. Cu. ft./hour | 65,000,000 |
| (14) Exhaust Air, Evaporated Water, Entrainment: | |
| Temperature, °F. | 90 |
| Typical Wet Bulb, °F. | 85 |
| Air Std. Cu. ft/hour | 65,000,000 |
| Evaporated Water, gallons/hour | 6,400 |
| Entrainment, at 3 concentrations, gallons/hour | 400 (a) |
| (a) amount estimated | |
| Typical pH Setting on 18: | 6.5 |
| Typical Operation of $H_2SO_4$ Valve 20: | |
| Cycles per hour | 10 |
| Acid injection phase, min., | 0.1 (b) |
| $H_2SO_4$ (66° Baume'), lbs/cycle | 0.1 |
| (b) can be about 0.015 to about 0.2 min. | |
| Typical Conductance Setting on 21: | |
| micromhos | 2,500 (c) |

(c) depends upon makeup water salts content and concentrations desired in the tower

I claim:

1. In a process for controlling the pH and salts concentration of water in a water circulating system wherein cool water is used to cool warmer fluids by indirect heat exchange and the resulting warm water is cooled and recirculated for further heat exchange, said process comprising measuring the pH of the water and adding acid to the water while the measured pH of the water exceeds a preset pH value, measuring the electrical conductivity of the water and releasing water from the system while the measured conductivity exceeds a predetermined value, adding water to the system to maintain a predetermined volume, the added water having a lower electrical conductivity than the released water, the improvement comprising releasing said water from the system intermittently on timed on/off cycles.

2. Process in accordance with claim 1 wherein said pH and said electrical conductivity are measured on the cool water, wherein warm water is released from said system and wherein said added water has a lower temperature than the released water.

3. Process of claim 1 wherein said acid is added to the water intermittently on timed on/off cycles.

4. Apparatus for controlling the pH and salts concentration of water in a circulating system which comprises:

means to measure the pH of the water;

means to add acid intermittently on a timed on/off cycle while the measured pH of the water exceeds a predetermined value;

means to measure the electrical conductivity of the water;

means to releasing water from the system intermittently on a timed on/off cycle while the measured conductivity exceeds a predetermined value; and means for adding makeup water to a predetermined volume, the makeup water having a lower electrical conductivity than the released water.

* * * * *